Nov. 11, 1952
E. E. HARDY ET AL
2,617,770
COMPOSITIONS OF MATTER COMPRISING
HALOGENATED ORGANIC COMPOUNDS
Filed Dec. 28, 1948
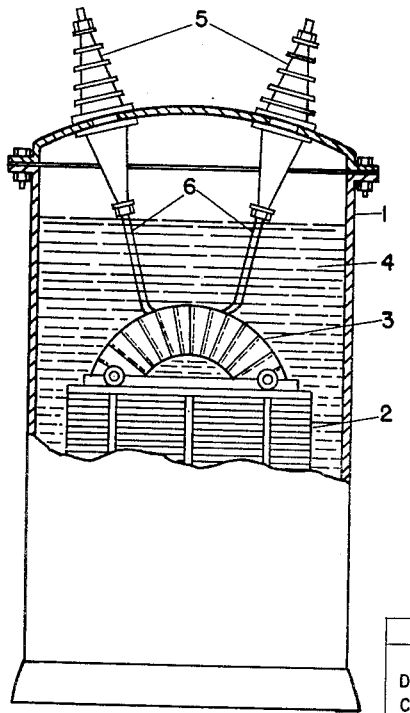
FIG. 1
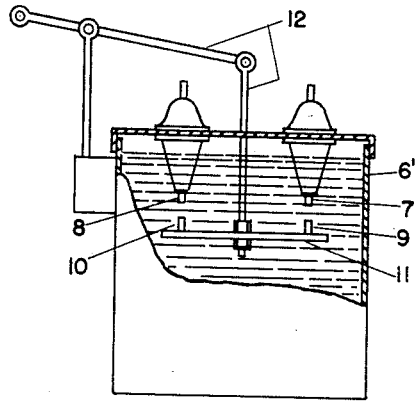
FIG. 2
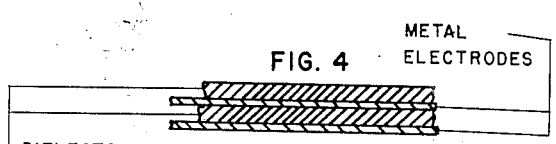
FIG. 4
DIELECTRIC CONTAINING HALOGENATED AROMATIC
COMPOUND AND ONE OF THE FOLLOWING AMINES:
2,4-DIAMINODIPHENYLAMINE, p-ANISIDINE,
o-ANISIDINE AND p-NITRO ANILINE, AS CORROSION
INHIBITOR
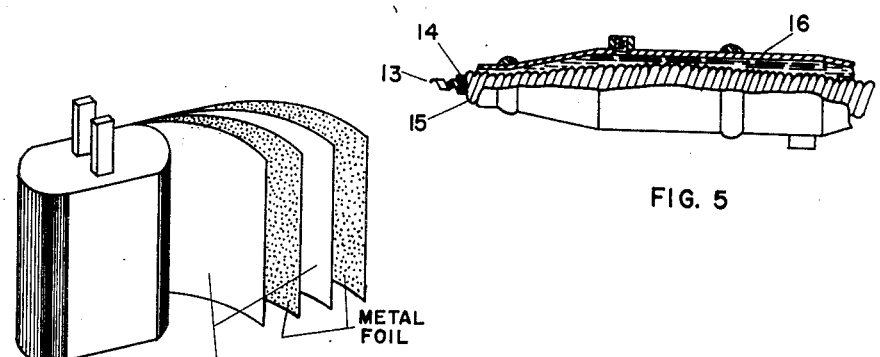
FIG. 3
FIG. 5
Edgar E. Hardy
Elwood F. Jackson
INVENTOR.
BY Elmer P. Rucker
ATTORNEY Patented Nov. 11, 1952

2,617,770

UNITED STATES PATENT OFFICE 2,617,770

COMPOSITIONS OF MATTER COMPRISING HALOGENATED ORGANIC COMPOUNDS

Edgar E. Hardy, Anniston, Ala., and Elwood F. Jackson, Ludlow, Mass., assignors to Monsanto Chemical Company, St. Louis, Mo., a corporation of Delaware Application December 28, 1948, Serial No. 67,666

19 Claims. (Cl. 252—63.7)

The present invention relates to novel compositions of matter comprising halogenated organic compounds and a scavenging or corrosion inhibiting material selected from the group consisting of 2,4-diaminodiphenylamine, o-anisidine, p-anisidine and p-nitro aniline. More specifically, the invention relates to apparatus, particularly electrical apparatus such as capacitors, transformers, circuit breakers, cables and the like containing the above compositions.

Halogenated organic compounds, more particularly halogenated aromatic compounds such as chlorinated biphenyl and chlorinated naphthalene are highly useful electrical insulating materials because of their high dielectric constants, thermal stability, resistance to oxidation, non-flammability and other valuable properties. However, it has been found that when exposed to elevated temperatures and/or high voltages, they partially decompose liberating hydrogen halides which have an exceedingly deleterious action on the paper insulation and metal parts of electrical apparatus.

For example, in transformers, circuit breakers and other electrical devices in which arcing occurs, the development of hydrogen halides as a result of the above decomposition presents a serious problem as they decrease the dielectric strength of the composition containing same and cause considerable damage by attacking paper insulation and corroding metal parts of the apparatus in which the composition is used. The undesirable effect of the above decomposition is further manifested when the above halogenated organic compounds are used as capacitor impregnants. Thus, under high operating temperatures and direct current voltages, capacitors impregnated therewith undergo a characteristic type of deterioration which results in an ever increasing leakage current, a short capacitor life, visible localized decomposition of the dielectric and corrosion of the electrodes. Moreover, in the case of capacitors operating on alternating current, the decomposition sometimes results in an excessive increase in power factor of the dielectric material.

It is, therefore, the object of the present invention to provide new compositions of matter containing halogenated organic compounds wherein the above objectionable properties are either completely eliminated or substantially reduced.

An additional object is to provide transformers, capacitors, circuit breakers, cables and the like containing halogenated organic compounds in combination with a corrosion inhibitor or scavenger whereby the deleterious action of hydrogen halides on the paper insulation and metal parts thereof is eliminated or materially reduced.

Another object is to provide a capacitor impregnant containing halogenated organic compounds and a corrosion inhibitor or scavenger, whereby the deleterious effect of hydrogen halides on the electrodes and paper insulation of capacitors is substantially reduced or completely eliminated with the result that the capacitor has a longer useful life and greater dielectric stability than similar capacitors not containing the corrosion inhibitor.

A further object is to provide the cellulosic insulation in transformers containing liquid halogenated organic compounds with protection against rapid destruction by hydrogen halides evolved as the result of a minor arc within the transformer, thus permitting complete repair of the assembly by rapid replacement or removal of the particular part that gave rise to the arc and thereby avoiding destruction of the entire paper insulation of the transformer with a consequent high cost of repair.

A still further object is to provide switches, cables and the like containing halogenated organic compounds and a corrosion inhibitor or scavenger which practically eliminates the rusting and corrosion normally accompanying the use of such devices filled with halogenated organic compounds per se.

Other objects and advantages of the present invention will become apparent to those skilled in the art as the description proceeds.

We have discovered that halogen decomposition products can be rendered substantially innocuous and the above objectives accomplished if, in accordance with the present invention, the halogenated organic materials to be protected are associated with a relatively small amount of an amine selected from the group consisting of 2,4-diaminodiphenylamine, o-anisidine, p-anisidine and p-nitro aniline. These compounds possess the surprising property of inhibiting the deleterious action of hydrogen halides on metals and organic insulation materials without materially affecting the electrical properties of the halogenated compound or composition with which they are incorporated. Of the above compounds, 2,4-diaminodiphenylamine is preferred since it possesses exceptional scavenging and corrosion inhibiting properties.

For a more complete understanding of the present invention, reference is made to the accompanying drawings and the experimental data hereinafter presented in the specific examples.

Figure 1 is a front elevation partly in section of a transformer; Figure 2 illustrates a switch in a similar manner; Figure 3 represents a rolled capacitor; Figure 4 shows a sectional view of a portion of the electrodes and dielectric sheets of Figure 3; and Figure 5 is a side view of a cable, the casing being partly removed to permit the interior of the parts to be seen.

The transformer illustrated in Figure 1 comprises a casing 1, core 2, coils 3 insulated with manila paper, kraft paper, cotton or other fibrous insulation, insulating and cooling medium 4, lead-in bushings 5, and suitable leads 6 connected to the coil assembly. The insulating and cooling medium may consist of chlorinated biphenyl, trichlorbenzene and 2,4-diaminodiphenylamine in the following proportions:

| | Parts by weight |
|---|---|
| Chlorinated biphenyl (60% Cl) | 60 |
| Trichlorbenzene | 40 |
| 2,4-diaminodiphenylamine | 0.1 |

Other well known liquid halogenated hydrocarbons or mixtures thereof may be used as the insulating and cooling liquid and various other halogenated organic compounds may constitute a part of such compositions, such as for example, halogenated compounds of naphthalene, toluene, benzene, nitro-diphenyl, diphenyl oxide, diphenyl ketone, diphenyl methane, diphenyl ethane, terphenyls, quaterphenyls, etc.

The presence of 0.05 to 0.1 part by weight of 2,4-diaminodiphenylamine in the cooling and insulating liquid will not only substantially reduce the deleterious effect of such liquid on organic insulation but will also greatly reduce the corrosion of the metal parts of the transformer which come in contact therewith in the presence or absence of air.

The switch shown in Figure 2 comprises a casing 6', fixed contacts 7 and 8, and movable contacts 9 and 10 which cooperate therewith. The movable contacts are mounted upon a support 11 which in turn is operatively connected to actuating levers 12. The following is illustrative of a suitable arc quenching liquid which may be used in this device, it being understood that the invention is not limited thereto.

| | Parts by weight |
|---|---|
| Chlorinated biphenyl (55% Cl) | 80 |
| Trichlorbenzene | 20 |
| p-Anisidine | 0.05 |

In the operation of electric switches, the unavoidable arcing which accompanies make-and-break of the switch contacts results in partial decomposition of the chlorinated biphenyl or other halogenated organic compounds. The presence of p-anisidine in the above liquid renders the halogen decomposition products innocuous with the result that switches provided therewith are substantially free from the corrosion normally accompanying the use of such devices filled with halogenated organic compounds per se.

The capacitor shown in Figure 3 is made up of alternate layers of metal foil such as aluminum or tin foil separated by sheets of dielectric material. It is produced by interleaving two dielectric sheets, such as linen or kraft paper, with the metal foil, and rolling the interleaved sheets in the conventional manner. The rolled capacitor is then impregnated with the dielectric composition by any suitable process, such as vacuum impregnation with chlorinated biphenyl having dissolved therein a small proportion of o-anisidine. The capacitor is then placed in a protective case or otherwise used as desired.

The following range of compositions is illustrative of suitable capacitor impregnants:

COMPOSITION I

Liquid chlorinated biphenyl, particularly chlorinated biphenyl containing from 42% to 60% by weight of chlorine, 0%–100% by weight
Conventional chlorinated organic dielectric materials, about 100%–0% by weight
o-Anisidine, 0.01%–1% by weight

COMPOSITION II

| | Parts by weight |
|---|---|
| Chlorinated biphenyl (42%–60% Cl) | 75 |
| Trichlorbenzene | 25 |
| o-Anisidine | 0.1 |

Of the above range of compositions, the preferred capacitor impregnant is one having the following composition:

| | Parts by weight |
|---|---|
| Chlorinated biphenyl (55% Cl) | 75 |
| Trichlorbenzene | 25 |
| o-Anisidine | 0.1 |

The presence of o-anisidine in chlorinated biphenyl or other halogenated organic compounds provides excellent protection against the deleterious action of halogen decomposition products on metal, paper and other organic insulation material and consequently capacitors provided therewith will have a longer useful life and greater dielectric stability than similar capacitors containing halogenated organic compounds per se. Moreover, capacitors containing the above compound will not exhibit an ever increasing power factor with time when operated at high temperatures and voltages as is typical of capacitors impregnated with halogenated organic materials which are not associated with one of the above corrosion inhibitors.

Figure 4 shows a section of one turn of the finished rolled capacitor illustrating the alternate electrodes and dielectric layers. In accordance with the present invention, the finished capacitor contains a halogenated organic compound, preferably chlorinated biphenyl, and a minor proportion of o-anisidine.

The cable of Figure 5 comprises a core 13, cable conductors 14, insulation consisting of paper or other suitable material 15 and a casing 16. The space between the insulated conductors and the casing is filled with a mixture of p-nitro-aniline and any of the liquid chlorinated organic compounds mentioned above. Such a composition may consist of a mixture of the following ingredients, but it is to be clearly understood that the invention is not restricted thereof.

| | Parts by weight |
|---|---|
| Chlorinated biphenyl (60% Cl) | 50 |
| Trichlorbenzene | 50 |
| p-Nitro-aniline | about 0.1 |

The experimental data hereinafter presented illustrate in a striking manner the scavenging or corrosion inhibiting action of 2,4-diaminodiphenylamine, p-anisidine, o-anisidine and p-nitro aniline on dielectric compositions containing halogenated organic compounds. In accordance therewith, the effect of the corrosion inhibitor is brought out by showing and comparing the action of an HCl-saturated halogenated dielectric composition, with and without the inhibitor, on organic dielectric materials such as paper. The effectiveness of the inhibitor is manifested by the protection it affords paper against attack by hydrogen chloride and the degree of attack is indicated by the extent to which the tensile strength of the paper is decreased. This will be rendered more apparent by reference to the following examples.

*Example I*

Six strips of manila wrapping paper (6″ x 1″) were humidified at 65% R. H. at 70° F. for a period of 48 hours and subjected to tensile strength tests. These tests were run on a Scott IP-2 serigraph with a jaw separation of 3 inches and a rate of travel of 34.5 seconds for a load of 40 lbs. The result of these tests, being the average of 6 breaks, was as follows: Tensile strength of paper samples, 46.2 lbs./in.

*Example II*

Six strips of the same piece of manila wrapping paper (7″ x 1″) were allowed to soak at a temperature of 75° C. for 1½ hours in an HCl saturated solution consisting of 60 parts by weight of chlorinated biphenyl (60% Cl) and 40 parts by weight of trichlorbenzene and at the end of this operation, the papers were soaked for 15 minutes in benzene, another 15 minutes in methanol and dried. After cutting one half inch from each end of the dried paper strips, they were subjected to the above tensile strength tests with the following result: Tensile strength of impregnated paper samples, 11.5 lbs./in.

These examples demonstrate that HCl had a highly deleterious action on the samples since the tensile strength of the paper changed from 46.2 lbs./in. to 11.5 lbs./in., a decrease in tensile strength of approximately 75%.

*Example III*

The foregoing example was repeated using samples of the same paper and the same impregnant except that 0.1 part by weight of p-anisidine was added. The tensile strength of the impregnated paper was found to be 48.3 lbs./in., thus demonstrating that the above compound is a highly effective material for rendering halogen decomposition products such as HCl innocuous to paper or other fibrous organic dielectrics.

*Example IV*

The procedure described in Example III was followed except that o-anisidine in an amount corresponding to 0.1 part by weight was substituted for p-anisidine. The paper samples had an average tensile strength of 44.7 lbs. as compared with 11.5 lbs./in. for the samples treated with impregnant not containing a scavenger, and 46.2 lbs./in. for the unimpregnated samples.

*Example V*

The procedure described in Example III was repeated using 0.1 part by weight of 2,4-diaminodiphenylamine in place of p-anisidine and the following result was obtained: Average tensile strength of paper samples, 49.7 lbs./in.

*Example VI*

The procedure described in Example III was repeated using 0.1 part of p-nitro aniline in place of p-anisidine and the following result was obtained: Average tensile strength of paper samples, 21.2 lbs./in.

The foregoing example shows that p-nitro aniline is less effective than the other amines; however, it is still a highly satisfactory scavenger or corrosion inhibitor for halogenated organic compounds as it is markedly superior to tetraphenyl tin, a material used commercially for the above purpose. As evidence of its superiority over tetraphenyl tin reference is made to the following results of tensile strength tests made with both of these compounds:

Tensile strength of untreated paper, 46.2 lbs./in.
Tensile strength of paper treated with composition consisting of 60 parts by weight of chlorinated biphenyl (60% Cl), 40 parts by weight of trichlorbenzene and 0.1 part by weight of tetraphenyl tin, 16 lbs./in.
Tensile strength of paper treated with composition consisting of 60 parts by weight of chlorinated biphenyl (60% Cl), 40 parts by weight of trichlorbenzene and 0.1 part by weight of p-nitro aniline, 21.2 lbs./in.

These tests show that the average tensile strength of the paper samples was reduced from 46.2 lbs./in. to 16 lbs./in. in the case of tetraphenyl tin, whereas when p-nitro aniline was employed, the tensile strength was reduced only to 21.2 lbs./in., thus demonstrating the superior scavenging action of the latter compound.

The following table illustrates the electrical properties of the dielectric composition consisting of 60 parts by weight of chlorinated biphenyl (60% Cl) and 40 parts by weight of trichlorbenzene and also shows the effect thereon of adding about 0.1 part by weight of 2,4-diaminodiphenylamine, p-anisidine, o-anisidine and p-nitro aniline respectively.

|  | Dielectric Strength at 30° C. | Dielectric Constant at 1,000 Cycles at 100° C. |
|---|---|---|
|  | Kv. |  |
| Chlorinated biphenyl (60% Cl), 60 parts by wt. Trichlorbenzene, 40 parts by wt. | 43 | 3.8 |
| Chlorinated biphenyl (60% Cl), 60 parts by wt. Trichlorbenzene, 40 parts by wt. 2,4-Diaminodiphenylamine, about 0.1 part by wt. | 42 | 3.9 |
| Chorinated biphenyl, (60% Cl), 60 parts by wt. Trichlorbenzene, 40 parts by wt. p-Anisidine, about 0.1 parts by wt. | 47 | 3.8 |
| Chlorinated biphenyl (60% Cl), 60 parts by wt. Trichlorbenzene, 40 parts by wt. o-Anisidine, about 0.1 part by wt. | 52 | 3.8 |
| Chlorinated biphenyl (60% Cl), 60 parts by wt. Trichlorbenzene, 40 parts by wt. p-Nitro aniline, about 0.1 part by wt. | 49 | 3.9 |

The above experimental data indicate that the above amines do not seriously affect the electrical properties of the halogenated organic compounds associated therewith and that, therefore, such compositions are eminently suitable for use in transformers, capacitors, switches, cables and other electrical devices.

The description of the present invention has been directed primarily to compositions containing chlorinated biphenyl, trichlorbenzene and an amine selected from the group consisting of 2,4-diaminodiphenylamine, p-anisidine, o-anisidine and p-nitro aniline, but it is to be understood that the invention is not restricted thereto but embraces halogenated organic compounds generally. Thus, the above compounds may be used as scavengers or corrosion inhibitors for chlorinated naphthalene, chlorinated diphenyl ketone, chlorinated diphenyl oxide, chlorinated diphenyl methane, chlorinated diphenyl ethane, chlorinated benzene, chlorinated toluene, chlorinated nitro diphenyl, chlorinated alkylated benzenes, chlorinated alkylated biphenyls, ethyl trichlorbenzene, ethyl tetrachlorbenzene, ethyl pentachlorbenzene, chlorinated terphenyls, chlorinated quaterphenyls, chlorinated paraffinic hydrocarbons, chlorinated alicyclic hydrocarbons, chlorinated oxygen-containing organic compounds, chlorinated rubber, chlorobutadiene polymers, chlorinated fats, chlorinated vegetable oils, chlorinated animal oils, chlorinated mineral oils or mixtures of two or more of these. In place of the chlorinated compounds, the corresponding fluorine, bromine and iodine derivatives may be used. In fact, any halogenated organic compound or composition which tends by reason of its halogen content to cause corrosion of metals or dehydration of paper or organic fibrous insulation, may be rendered substantially innocuous by means of the above amines.

The method of incorporating the amines varies with the halogenated organic compound or composition. If the compound or composition is liquid at room temperature, the above compounds are merely dissolved therein in suitable concentrations; if it is a solid, the amine is blended therewith by the use of solvents or swelling agents or by means of mixing rolls, etc. In the case of halogenated polymers, the amine compound may be incorporated before, during or after polymerization of the corresponding monomers.

The quantity of amine used varies with the halogenated organic compound or composition. In general, satisfactory results are obtained by employing these compounds in an amount varying from 0.05% to 1% and preferably from 0.05% to 0.1% by weight of the halogenated organic compound or composition, but it is to be understood that the invention is not limited thereto as slightly lower and somewhat higher concentrations may be employed. Stated broadly, the above compounds may be used in amounts varying from 0.01% by weight up to and above the limit of its solubility in the halogenated organic compound or composition. In most instances, it is desirable not to exceed the solubility limits of the amine, but there are some applications such as heat exchanging operations in which this may be done without harmful effects.

As widely different embodiments of this invention may be made without departing from the spirit thereof, it is to be understood that the invention is not limited to the specific embodiments except as defined in the appended claims.

We claim:

1. A composition of matter consisting essentially of a halogenated aromatic compound and as a scavenger therefor an amine selected from the group consisting of 2,4-diaminodiphenylamine, p-anisidine, o-anisidine and p-nitro aniline, said amine being used in an amount sufficient to render the halogen decomposition products of said halogenated aromatic compound substantially innocuous.

2. A composition of matter consisting essentially of a chlorinated aromatic compound and as a scavenger therefor about 0.01% to about 1% by weight of an amine selected from the group consisting of 2,4-diaminodiphenylamine, p-anisidine, o-anisidine and p-nitro aniline.

3. A heat transfer and dielectric composition consisting essentially of chlorinated biphenyl and as a scavenger therefor about 0.05% to about 1% by weight of an amine selected from the group consisting of 2,4-diaminodiphenylamine, p-anisidine, o-anisidine and p-nitro aniline.

4. An insulating and cooling medium for electric apparatus consisting essentially of a liquid chlorinated biphenyl and as a scavenger therefor about 0.05% to about 1% by weight of an amine selected from the group consisting of 2,4-diaminodiphenylamine, p-anisidine, o-anisidine and p-nitro aniline.

5. A liquid dielectric composition consisting essentially of chlorinated biphenyl and as a scavenger therefor about 0.05% to about 1% by weight of an amine selected from the group consisting of 2,4-diaminodiphenylamine, p-anisidine, o-anisidine and p-nitro aniline, said chlorinated biphenyl containing from 42% to 60% by weight of chlorine.

6. A liquid dielectric composition consisting essentially of chlorinated biphenyl and as a scavenger therefor about 0.01% to about 1% by weight of an amine selected from the group consisting of 2,4-diaminodiphenylamine, p-anisidine, o-anisidine and p-nitro aniline, said chlorinated biphenyl containing from 42% to 60% by weight of chlorine.

7. A liquid dielectric composition consisting essentially of chlorinated biphenyl and as a scavenger therefor about 0.05% to about 0.1% by weight of an amine selected from the group consisting of 2,4-diaminodiphenylamine, p-anisidine, o-anisidine and p-nitro aniline, said chlorinated biphenyl containing from 42% to 60% by weight of chlorine.

8. A liquid dielectric composition defined in accordance with claim 7 wherein p-anisidine is the amine employed.

9. A liquid dielectric composition defined in accordance with claim 7 wherein o-anisidine is the amine employed.

10. A liquid dielectric composition defined in accordance with claim 7 wherein 2,4-diaminodiphenylamine is the amine employed.

11. A liquid dielectric medium for transformers having substantially the following composition:

|  | Per cent by weight |
|---|---|
| Chlorinated biphenyl (60% Cl) | about 60 |
| Trichlorbenzene | about 40 |
| p-Anisidine | about 0.1 |

12. An electric arc quenching medium having substantially the following composition:

|  | Per cent by weight |
|---|---|
| Chlorinated biphenyl (55% Cl) | about 80 |
| Trichlorbenzene | about 20 |
| p-Anisidine | about 0.05 |

13. A capacitor impregnant having the following composition range:

|  | Per cent by weight |
|---|---|
| Liquid chlorinated biphenyl, particularly chlorinated biphenyl containing from 42% to 60% by weight of chlorine | about 0–about 100 |
| Trichlorbenzene | about 100–about 0 |
| o-Anisidine | about 0.01–about 1 |

14. A capacitor impregnant having substantially the following composition:

|  | Per cent by weight |
|---|---|
| Chlorinated biphenyl (55% Cl) | about 75 |
| Trichlorbenzene | about 25 |
| p-Anisidine | about 0.1 |

15. A liquid dielectric medium for transformers having substantially the following composition:

| | Per cent by weight |
|---|---|
| Chlorinated biphenyl (60% Cl) | about 60 |
| Trichlorbenzene | about 40 |
| 2,4-diaminodiphenylamine | about 0.05 to about 0.1 |

16. A liquid dielectric medium for transformers having substantially the following composition:

| | Per cent by weight |
|---|---|
| Chlorinated biphenyl (60% Cl) | about 60 |
| Trichlorbenzene | about 40 |
| 2,4-diaminodiphenylamine | about 0.1 |

17. An electric arc quenching medium having substantially the following composition:

| | Per cent by weight |
|---|---|
| Chlorinated biphenyl (60% Cl) | about 50 |
| Trichlorbenzene | about 50 |
| p-Nitro aniline | about 0.1 |

18. A capacitor impregnant having substantially the following composition:

| | Per cent by weight |
|---|---|
| Chlorinated biphenyl (42%–60% Cl) | about 75 |
| Trichlorbenzene | about 25 |
| o-Anisidine | about 0.1 |

19. A capacitor impregnant having substantially the following composition:

| | Per cent by weight |
|---|---|
| Chlorinated biphenyl (55% Cl) | about 75 |
| Trichlorbenzene | about 25 |
| o-Anisidine | about 0.1 |

EDGAR E. HARDY.
ELWOOD F. JACKSON.

REFERENCES CITED

The following references are of record in the file of this patent:

UNITED STATES PATENTS

| Number | Name | Date |
|---|---|---|
| 2,041,594 | Clark | May 19, 1936 |
| 2,077,429 | McMahon | Apr. 20, 1937 |
| 2,391,685 | Egerton | Dec. 25, 1945 |
| 2,468,544 | Clark | Apr. 26, 1949 |